United States Patent [19]

Krzywicki et al.

[11] Patent Number: 5,151,654
[45] Date of Patent: Sep. 29, 1992

[54] TACHOMETER SYSTEM FOR MEASURING THE RPM OF AN INTERNAL COMBUSTION ENGINE WITH NO PHYSICAL OR VISUAL CONNECTION

[75] Inventors: Stanley J. Krzywicki, Olney; Timothy S. Gibson, Columbia; Joseph D. Orndorff, Baltimore, all of Md.

[73] Assignee: Systems Control, Inc., Sunnyvale, Calif.

[21] Appl. No.: 215,642

[22] Filed: Jul. 6, 1988

[51] Int. Cl.⁵ .......................... G01P 3/42; G01P 3/48; G01P 3/54
[52] U.S. Cl. .................... 324/160; 324/169; 324/173
[58] Field of Search .............. 324/160, 166, 169, 380, 324/381, 390, 391, 392, 402, 170, 173, 174; 364/565, 431.07; 307/265, 267

[56] References Cited

U.S. PATENT DOCUMENTS

| | | | |
|---|---|---|---|
| 3,811,089 | 5/1974 | Strzelewicz | 324/402 |
| 4,594,886 | 6/1986 | Chen | 324/392 |
| 4,687,991 | 8/1987 | Kruncos | 324/160 |
| 4,745,554 | 5/1988 | Tomozawa et al. | 364/564 |

*Primary Examiner*—Walter E. Snow
*Attorney, Agent, or Firm*—Flehr, Hohbach, Test, Albritton & Herbert

[57] ABSTRACT

A tachometer system for an internal combustion engine. The tachometer system uses one of two electromagnetic pulse sensing means to detect an electromagnetic signal produced by a firing of the engine. The sensing device may be an antenna or an inductive pickup. One of the signals is chosen and processed. A parameter indicative of pulse timing in the output signal is determined. This parameter is most advantageously a time between different ones of the output signals. The parameter is then converted into a value indicative of revolutions per unit time of the engine. The converting structure is advantageously formed by a personal computer.

7 Claims, 7 Drawing Sheets

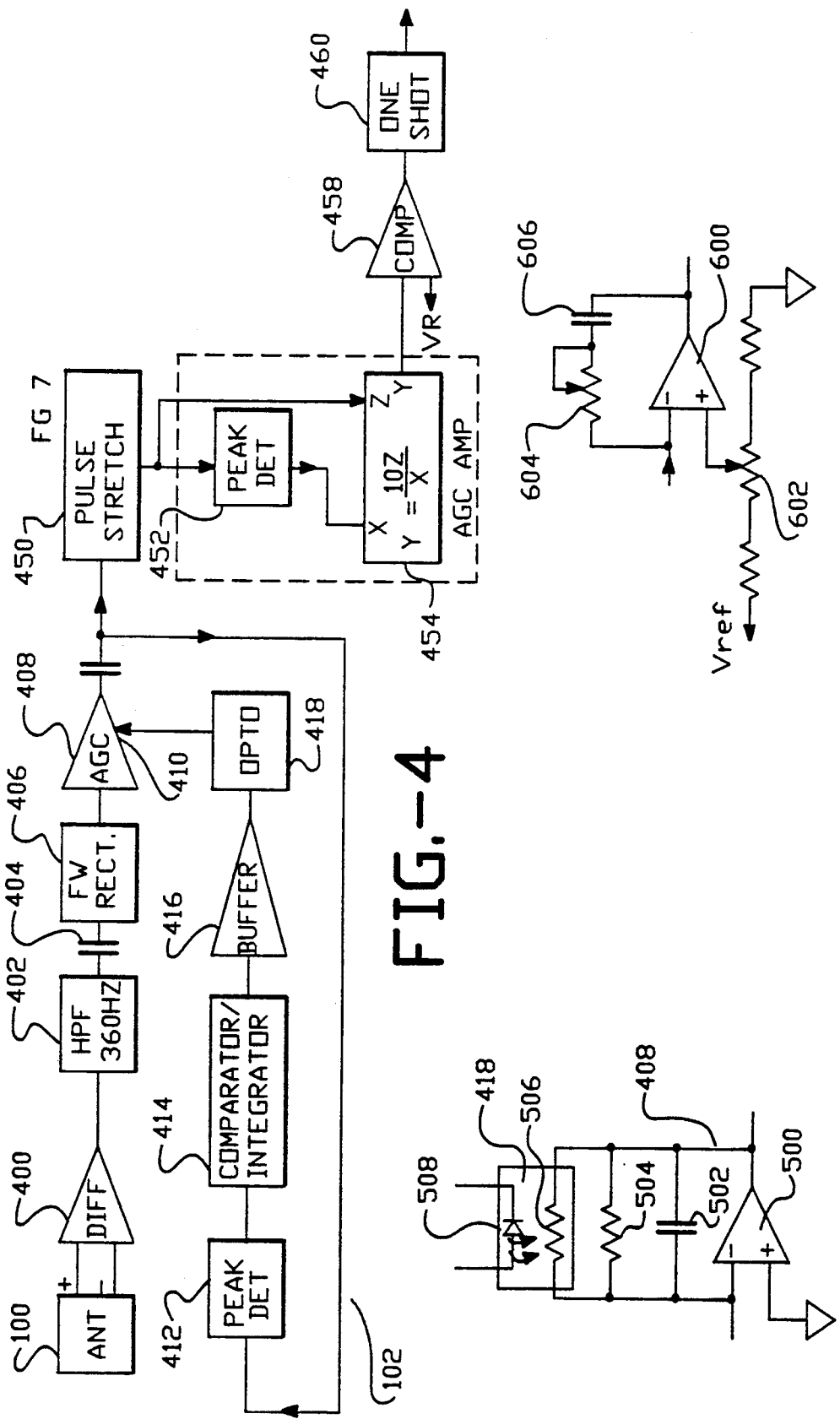

TACHOMETER SYSTEM FOR MEASURING THE RPM OF AN INTERNAL COMBUSTION ENGINE WITH NO PHYSICAL OR VISUAL CONNECTION

FIELD OF THE INVENTION

The present invention relates to a tachometer which senses an electromagnetic signal produced by a firing of said engine. More specifically, the present invention relates to a tachometer system which can operate with either of an antenna type non-contact sensor, or an induction type pickup which senses a spark plug firing, to determine revolutions per unit time of an engine.

BACKGROUND OF THE INVENTION

It is often necessary to determine revolutions per unit time of an internal combustion engine. Such a measurement typically uses a device known as a tachometer. Tachometers are most often used in automotive applications. For instance, applications for repetitive automotive testing may require an accurate RPM reading. This is required in such fields as automotive emission testing or safety inspections. Such testing operations not only require an accurate measurement of RPM, but also require that the device be easily and temporarily attached to the automobile operative portions. Much time can be saved if the user does not have to physically connect the device to the internal combustion engine.

Devices in the prior art have typically either physically connected a device to a moving part of the internal combustion engine, or have used an optical sensor to detect the movement of the internal combustion engine. The use of an optical sensor is disadvantageous since a white line or marker of that type must be attached to the internal combustion engine before the detection can be made. Moreover, this white line can become obscured by natural grease that forms within the engine compartment of the engines.

Physical contact with the internal combustion engine can also be dangerous for the people operating the device.

Furthermore, many new engines being manufactured today use a so-called distributorless system. These engines will not accommodate a conventional tachometer system. For instance, the GM Quad 4 has no accessible spark plug wires or exposed ignition cords. The inventors of the present invention have found that a non-contact antenna system which senses electromagnetic signals produced by firing of the engine, would lend itself very well to this application. Such a system could be used with no specialized testing equipment being required, nor would any complicated hook-ups be necessary.

It would also be advantageous if this tachometer system could interface with a personal computer. This would enable RPM readings to be stored in the computer's memory and to perform comparative analysis of RPM versus hydrocarbon, carbon monoxide or carbon dioxide emissions.

SUMMARY OF THE INVENTION

In recognition of all these problems, the present invention provides a non-contact tachometer which can be used in two different modes. A first mode uses an antenna system which senses an electromagnetic pulse produced by an ignition coil of the engine. A second mode uses an inductive pickup coupled to a spark plug wire of the engine. Both of these modes are non-contact modes in the sense that no physical connection to a lead, or to a portion of the engine is necessary.

Either of these systems can be used for acquiring an indication of an electromagnetic signal produced by a firing of the engine. An output signal indicative thereof is produced. Timing indicative of the pulses in the output signal is determined, and converted into a value indicative of revolutions of the internal combustion engine per unit time.

In a particularly preferred embodiment of the invention, the tachometer circuit board is in the form of an expansion card for a known personal computer. The RPM value displayed is the actual RPM, plus or minus 50, of the car's engine.

This tachometer circuit board also itself includes other novel features. One such feature is a pulse stretching circuit which stretches the pulse width of the signals from the non-contact sensor while maintaining a voltage (or proportional voltage) thereof. The pulse stretching circuit receives the input signals and applies the input signals to one input of each of a plurality of comparators. A voltage dividing structure is provided for producing a plurality of voltages which differ from one another by a substantially constant amount. These voltages are connected to the other input of each of the comparators. The output of the comparators indicates which of the inputs is the larger signal. Each output of each comparator is coupled to one of a plurality of means for producing a pulse. This pulse can typically be produced by a monostable multivibrator. Therefore, a different number of these pulse producing structures are triggered, based on how many of the comparators are in a predetermined state. Outputs of all of the pulse width producing means are summed so that the amplitude of the summed output is proportional to the voltage of the short pulse input.

Another preferred embodiment of the invention counts time between the pulses in a new and novel way.

BRIEF DESCRIPTION OF THE DRAWINGS

A presently preferred embodiment of the invention will be described in detail with reference to the accompanying drawings, wherein:

FIG. 4 shows, in block diagram form, a detailed layout of the antenna processing circuitry of FIG. 1;

FIG. 5 shows a detailed layout of the automatic gain control circuit 408 of FIG. 4;

FIG. 6 shows the comparator integrator circuit 414 of FIG. 4 in detail;

DETAILED DESCRIPTION OF THE PREFERRED EMBODIMENT

Figure 1:
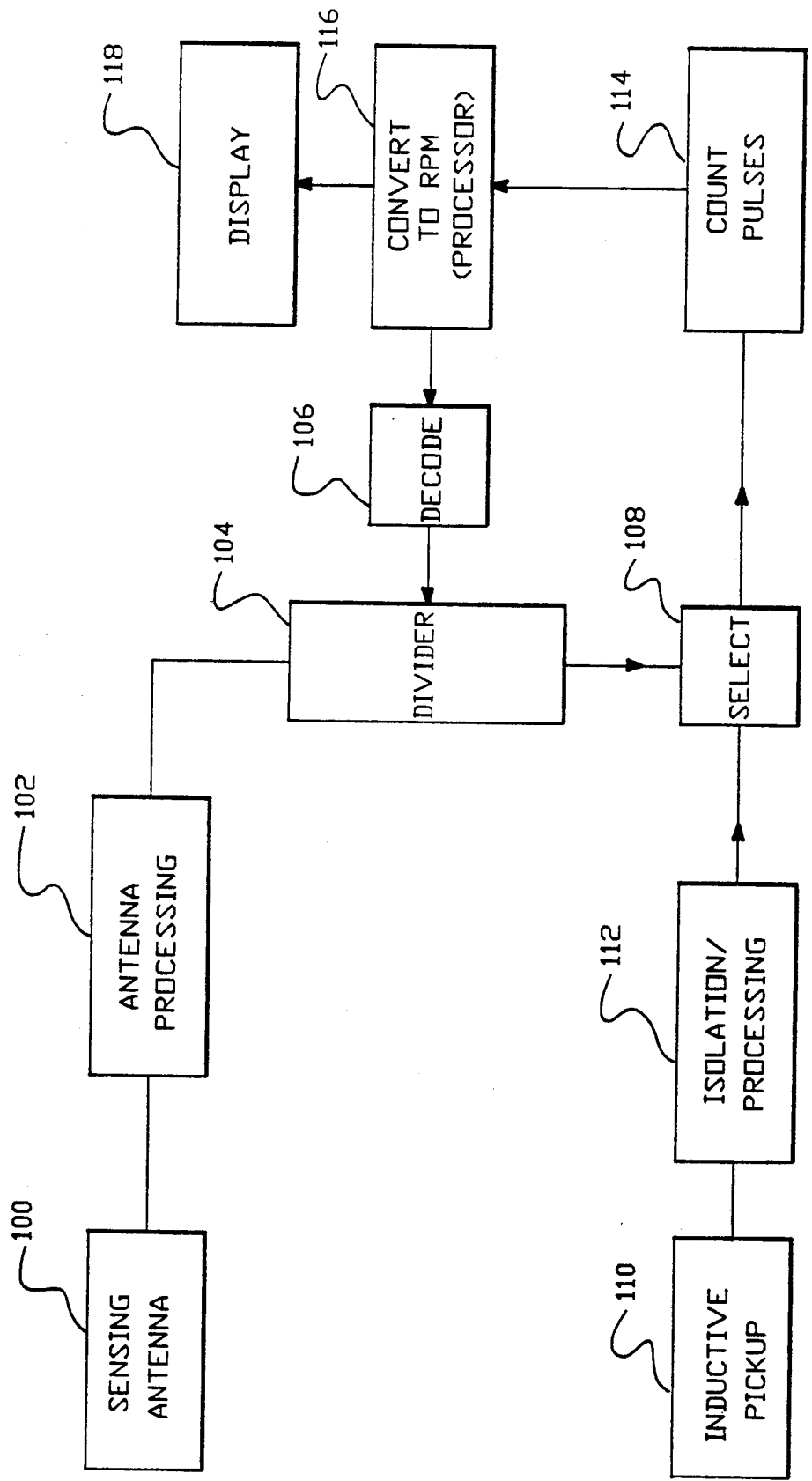
FIG. 1 shows a block diagram of the tachometer system of the present invention.

FIG. 1 shows a block diagram of the tachometer system used according to the present invention. This basic embodiment includes two different electromagnetic pulse sensing means. Both of the means are coupled in a non-contact manner to an operative area of the internal combustion engine. The first possible pulse sensing means is a sensing antenna 100 which senses an electromagnetic pulse produced by an ignition coil of the engine. Sensing antenna 100 is connected to antenna processing circuitry 102. This includes circuitry to remove noise from the signal and to increase the level thereof, to ensure that the output signal thereof accurately represents the electromagnetic pulses produced by the engine of the vehicle. Since sensing antenna 100 will detect every firing of the engine, the output thereof must be divided by a divider 104 for reasons clarified later. Divider 104 includes a programmable divider circuit. Decoder 106 is provided which receives input signals from the processing means which is a personal computer in this embodiment, and which programs the divider to divide by N, where N is dependent on the number of cylinders of the vehicle. In order to maximize the flexibility of the structure, the divider ratio is programmable, so that it may be used with all different number cylinder engines. The output of divider 104 is coupled to selector 108 which will be described later.

The alternative pickup configuration includes inductive pickup 110. Inductive pickup 110 is adapted to be located near a spark plug wire of the engine so as to acquire an indication of the electromagnetic signal produced by the firing of one cylinder of the engine, as indicated by a signal through the spark plug wire. Accordingly, since inductive pickup 110 is located on only one of the spark plug wires, the number of pulses received thereby will be 1/N of the number of pulses received by the sensing antenna 100. The output of inductive pickup 110 is coupled through isolation/processing circuitry 112 to selector 108. Since inductive pickup 110 receives only 1/N the number of signals that are received by sensing antenna 100, if divider 104 is set to 1/N, both inputs to selector 108 should be the same. This is the object of divider 104, so that selector 108 receives two input signals, each indicating one single pulse for each N firings (where N is the number of cylinders) of the engine. Counter circuitry 114 detects a parameter in the timing in the output signal, while conversion to RPM is performed by processor 116. The final converted value is displayed on display 118.

Figure 2:
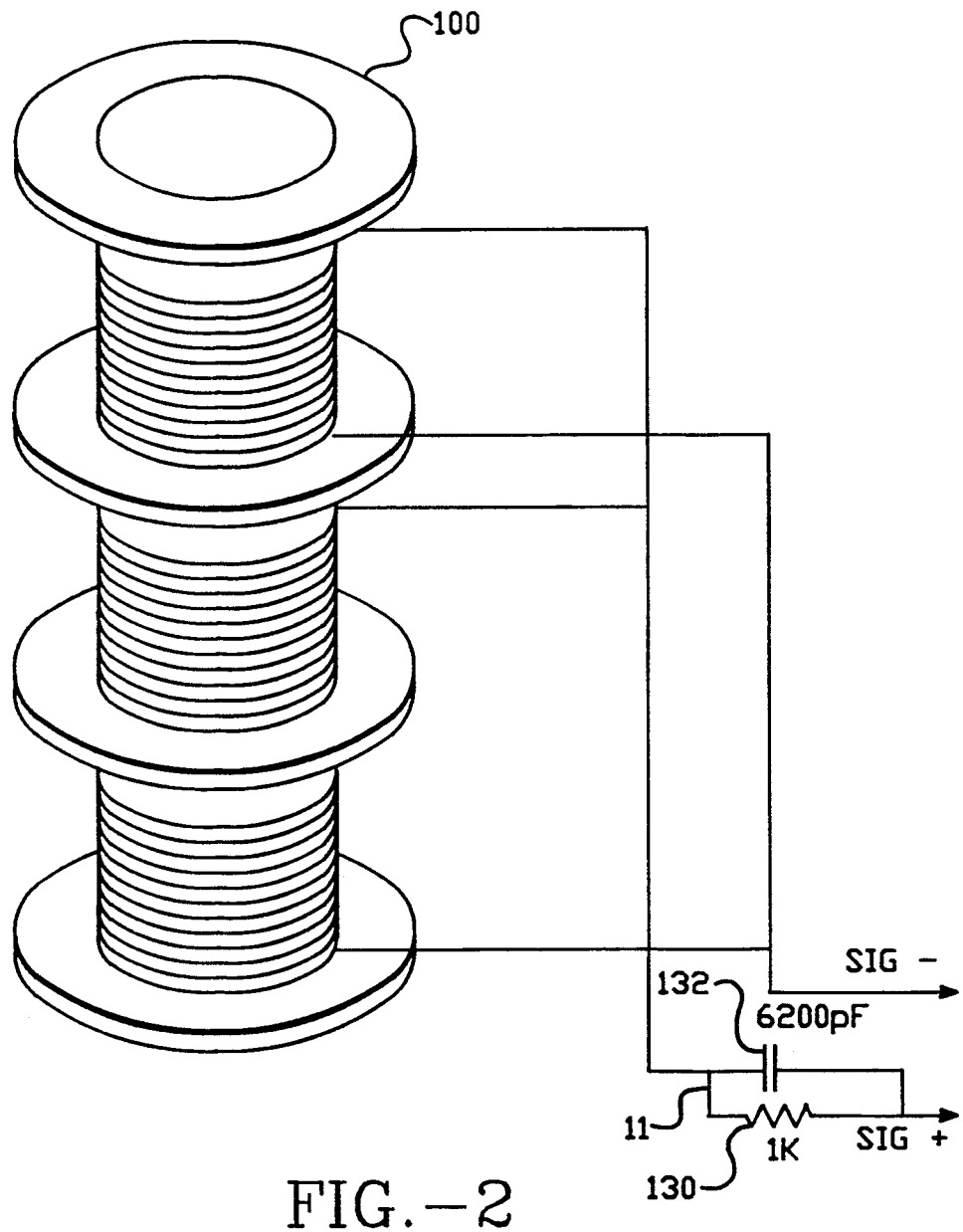
FIG. 2 shows an example of the antenna used in the antenna mode.

Sensing antenna 100 is shown in more detail in FIG. 2.

Antenna 100, in this preferred embodiment, is formed of a number 61 material ferrite rod with 0.720/0.780 O.D. by 2.2/2.3 long, and three coil windings of equal size wound around the rod. Each coil is wound 1,000 turns using 30 AWG wire. All three coils are wound in-phase, and are wired in parallel. A passive filter 11 is wired to the output of the signal+lead. Passive filter 11 includes a 1KΩ resistor 130 in parallel with a 6200 pF capacitor 132.

Any other suitable sensing antenna which senses engine firing pulses could alternately be used.

Figure 3:
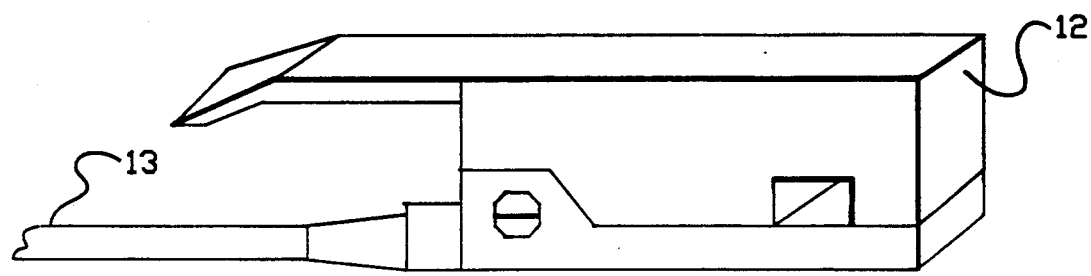
FIG. 3 shows an example of the induction pickup used in the induction pickup mode.

FIG. 3 shows the inductive pickup type antenna. This induction pickup 12 is a standard part made by Sun Electric, part number 507-006. Pickup 12 is connected to cable 13 which is embodied by a Sun Electric part number 507-006 with Belden 9259 coax.

FIG. 4 shows a more detailed layout of signal processing circuitry 102 shown in FIG. 1. FIG. 2 shows the antenna 100 as producing two signals: a plus signal and a minus signal. These signals are fed into a high impedance low drift instrumentation amplifier 400. In this embodiment, instrumentation amplifier 400 is configured as a differential amplifier with a voltage gain of approximately 100. Differential amplifier circuitry 400 has the purpose of removing common mode noise from the antenna leads. The output of differential amplifier 400 is passed through high pass filter 402 which has a cut-off frequency of 360 Hz as a further noise-reducing technique. Therefore, 60 cycle noise along with common harmonics thereof are removed. The output of high pass filter 402 is connected through capacitor 404 to full-wave rectifier 406. This full-wave rectifier 406 in this embodiment is formed by an operational amplifier configured as a rectifier and need not be configured as a passive full-wave rectifier, although such is possible. The output of full-wave rectifier 406 is fed directly to an automatic gain control amplifier (AGC) 408. Automatic gain control amplifier 408 has the purpose of maintaining the signal strength, independent of the type of engine being measured or the distance between the ignition coil and antenna 100. It is very important that the output signal from antenna processing circuitry 102 be independent of the type of engine being used, or the characteristics of the operator. AGC 408 serves to maintain a constant output.

The output of AGC 408 is connected back through a feedback loop to the gain control input 410 of AGC 408. The output of AGC 408 is connected first to peak detector 412 which detects the peaks in this output signal, per unit time. The output of peak detector 414 is connected to a comparator/integrator circuit 414 where it is compared with a predetermined reference and slightly integrated. The resulting signal is buffered in buffer 416 and optically isolated by opto isolator 418.

A detailed circuit diagram of AGC 408 and opto 418 is shown in FIG. 5. AGC 408 is formed in this embodiment by a National Semiconductor part number LF356 amplifier, connected as an inverting amplifier. Capacitor 502 in this embodiment has a value of 32 pF with resistor 504 having a value 200 kΩ. Opto 418 is a part number CLM6000 which includes a variable photo-resistor 506 and photo-diode 508.

A detailed layout of comparator/integrator circuit 414 is shown in FIG. 6. Comparator/integrator circuit 414 is formed of a type MC1458 operational amplifier 600 connected as a comparator. A reference voltage is applied to the non-inverting input and is adjustable using potentiometer 602. The integration uses potentiometer 604 as a resistance in series with capacitor 606 which is a 22 pF capacitor.

The output of AGC 408 in FIG. 4 is connected in a pulse stretching network 450. This pulse stretching network will be described in more detail with reference to FIG. 7. Briefly stated, however, the pulse stretching network lengthens the length of the pulse while producing a voltage output signal which is proportional to the voltage input. The pulse-stretching network 450 takes the very short duration pulses of typically 20 microseconds that correspond to the spark plug firing. These pulses are widened to 500 microseconds, while still maintaining an output signal proportional in peak voltage to the input signal. The wider time pulse is desirable to allow the peak detector 452 a sufficient amount of time to charge up to its full peak voltage. The pulse signal output by pulse-stretching network 450 is also fed to a second AGC amp 454 which has a digital dividing network therein. The output of pulse-stretching network goes into input Z of AGC 454 while the output of peak detector 452 enters input X of peak detector 454. The output Y follows the relation (y=10Z/X). This 454 AGC is typically embodied by an analog divider.

The output of AGC amp 454 is connected to comparator 458 which compares the output thereof with a voltage reference—typically eight volts. Anything less than this voltage reference is rejected as noise. The output of comparator 458 is connected to a one-shot 460 which produces a pulse corresponding to each pulse that is detected as being a real firing of the engine. One-shot 460 produces a pulse of approximately 5 milliseconds limited to a +5 volt peak-to-peak output. The output of one-shot 460 is then connected to divider 104 in FIG. 1.

Pulse-stretching network 450 will now be described with reference to FIG. 7.

Figure 7:
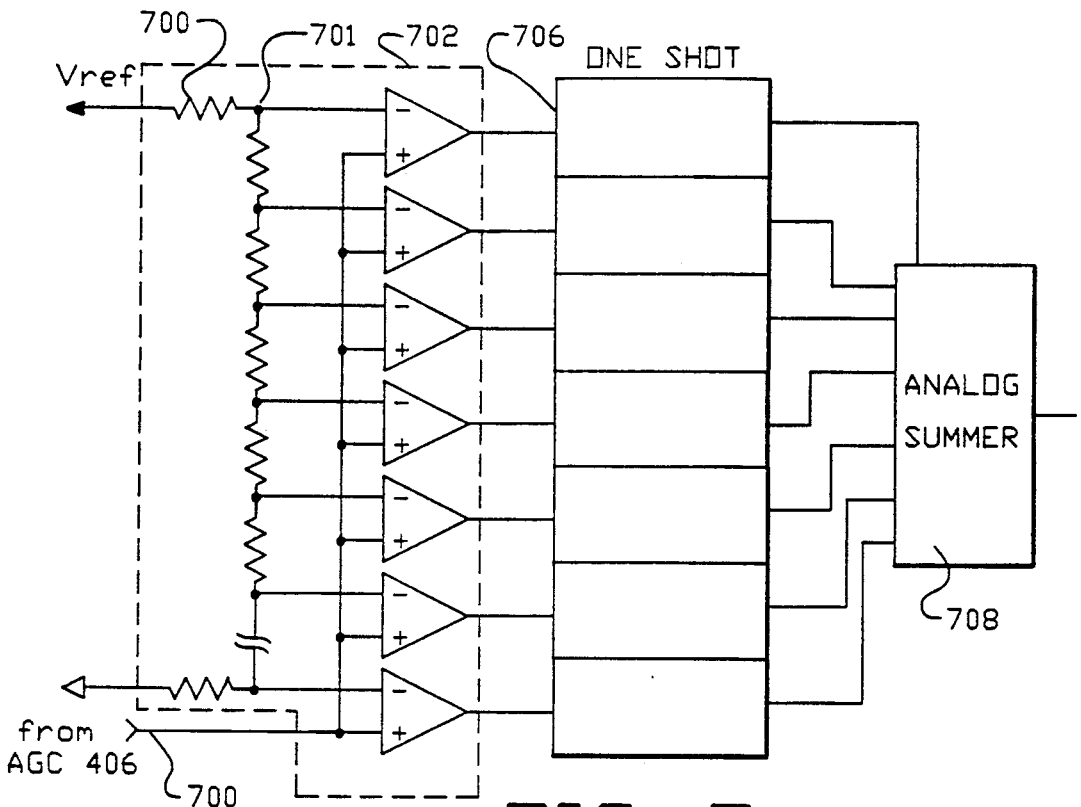
FIG. 7 shows the pulse stretching network in detail.

FIG. 7 shows the preferred embodiment of the pulse-stretching network of the present invention. This network has an object of producing pulses as outputs that have a predetermined width, but which have an output voltage proportional to the input voltage. Accordingly, this circuit amplifies the pulses somewhat, still keeping a proportional voltage to the input voltage. However, the width of these pulses is widened.

The voltage pulse is input from AGC 408 at receiving area 700. This input is coupled to the compare inputs of each of the comparators in comparator bank 702. Although only seven comparators are shown in FIG. 7, it is understood that many more comparators are contemplated. In fact, the preferred embodiment contemplates a bank of 12 comparators being used, with a greater number of comparators increasing the accuracy. The reference input of each comparator is biased with a voltage from voltage ladder 704. Voltage ladder 704 provides a plurality of stepped voltages having constant intervals therebetween. These stepped voltages are connected to the reference inputs of the respective comparators. Therefore, each comparator has the AGC voltage coupled to one (compare) input thereof and a respective and different reference input coupled to the reference input thereof. The voltages lower down the ladder are therefore lower than those higher in the ladder. Moreover, the higher the voltage from AGC 408 becomes, the more comparators within comparator bank 702 will trigger.

Each pulse from AGC 408 therefore triggers a number of comparators proportional to on its voltage. Each comparator that is triggered triggers one of the one-shots in one-shot bank 706. Each one-shot produces a corresponding pulse of approximately 500 microseconds. The plurality of pulses are summed together in analog summer 708.

The result is that the output pulse will have a time width of 500 microseconds. However, the voltage of the pulse will depend on how many one-shots have fired, which itself is based on how many comparators have been triggered. Therefore, the voltage at input 700 will control the voltage out of analog summer 708.

The output of the antenna processing 102 is connected to a programmable divider 104. Divider 104 is diagrammatically shown in FIG. 8.

Figure 8:
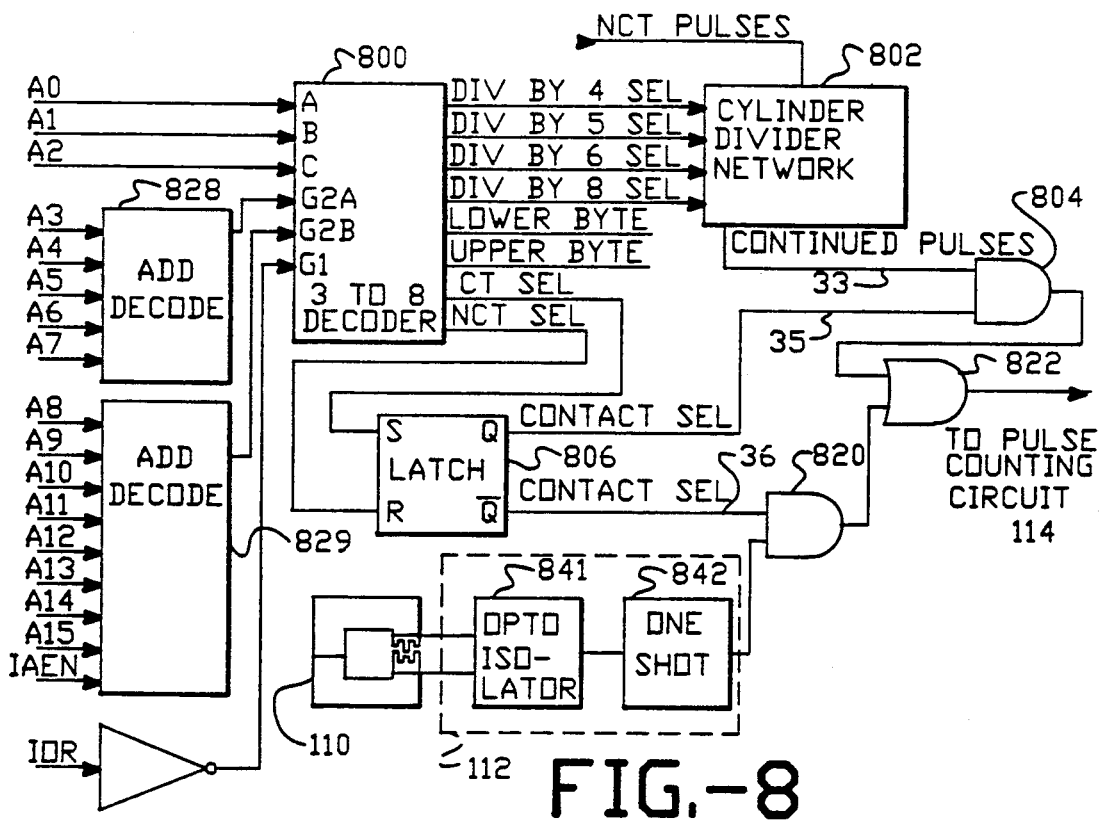
FIG. 8 shows a detailed layout of the processing for the inductive pickup along with the dividing network for the antenna, along with the selecting network.

Address signals A0–A15 are received from the personal computer (processor 114) to address the FIG. 8 control circuitry. The lowest order lines A0, A1 and A2 set the divide by x ratio and are connected to the inputs of a three-to-eight decoder 800. Three-to-eight decoder 800 produces a plurality of outputs indicative of the number of cylinders which are selected. A plurality of outputs labeled divide by 5, divide by 6 divide by 8, divide by 4, etc., are connected to cylinder network 31. Cylinder divider network 31 receives the inductive-pickup pulses from one-shot 460 of FIG. 4. Cylinder divider network is a standard programmable divide by N divider, and divides the pulses by the selected amount.

The output of cylinder divider network 802 is connected to AND gate 804. AND gate 804, along with latch 806, acts as the selector of the present invention.

In this embodiment, the selection of whether sensing antenna 100 or inductive pickup 110 should be used is provided by the two lowest order bits of the three-to-eight decoder. Once the antenna induction selection is made, it remains in force until a different selection is made. The outputs CT and NCT, representing respectively sensing antenna 100 and inductive pickup 110, are connected to SR latch 806. SR latch 806 latches an output corresponding to the sensing structure which should be used. The Q output, which is low for active output, is indicative of the inductive pickup 110 having been selected and is connected to the enable input of AND gate 804. Therefore, when sensing antenna 100 is selected, contact $\overline{Q}+$ select is high, and conditioned pulses 33 from cylinder divider network 802 are passed through AND gate 804. In contrast, when inductive pickup 110 is chosen, the $\overline{Q}+$ output is low, disabling AND gate 804. However, AND gate 820 is enabled by a high output on $\overline{Q}+$ of the latch 806.

Addresses A3–A15 represent the board address. These addresses are connected into address decoders A28 and A29, respectively. Each address decoder produces a signal when the proper address is received. These signals are used as enables to the three-to-eight decoder 800.

Inductive pickup 110 is also shown in FIG. 8. Inductive pickup 110 is connected to isolation processing 112 which includes an opto isolator 841 connected to a one-shot 842. Since the pulses from the induction pickup will typically include much noise, opto isolator 841 isolates these signals from the remainder of the circuit to prevent component damage. One-shot 42 is used to obtain a pulse width of 20 milliseconds to match the pulse width output of one-shot 460 of FIG. 4. The output of one-shot 842 is connected to AND gate 820 which is enabled when inductive pickup is selected. Therefore, AND gate 804 is enabled when sensing pickup is selected and AND gate 112 is enabled when inductive pickup is selected. Whichever pulses are selected by either AND gate 804 or 820 are coupled through OR gate 822 to the pulse counting circuit 114. This is shown in more detail in FIG. 9.

Figure 9:
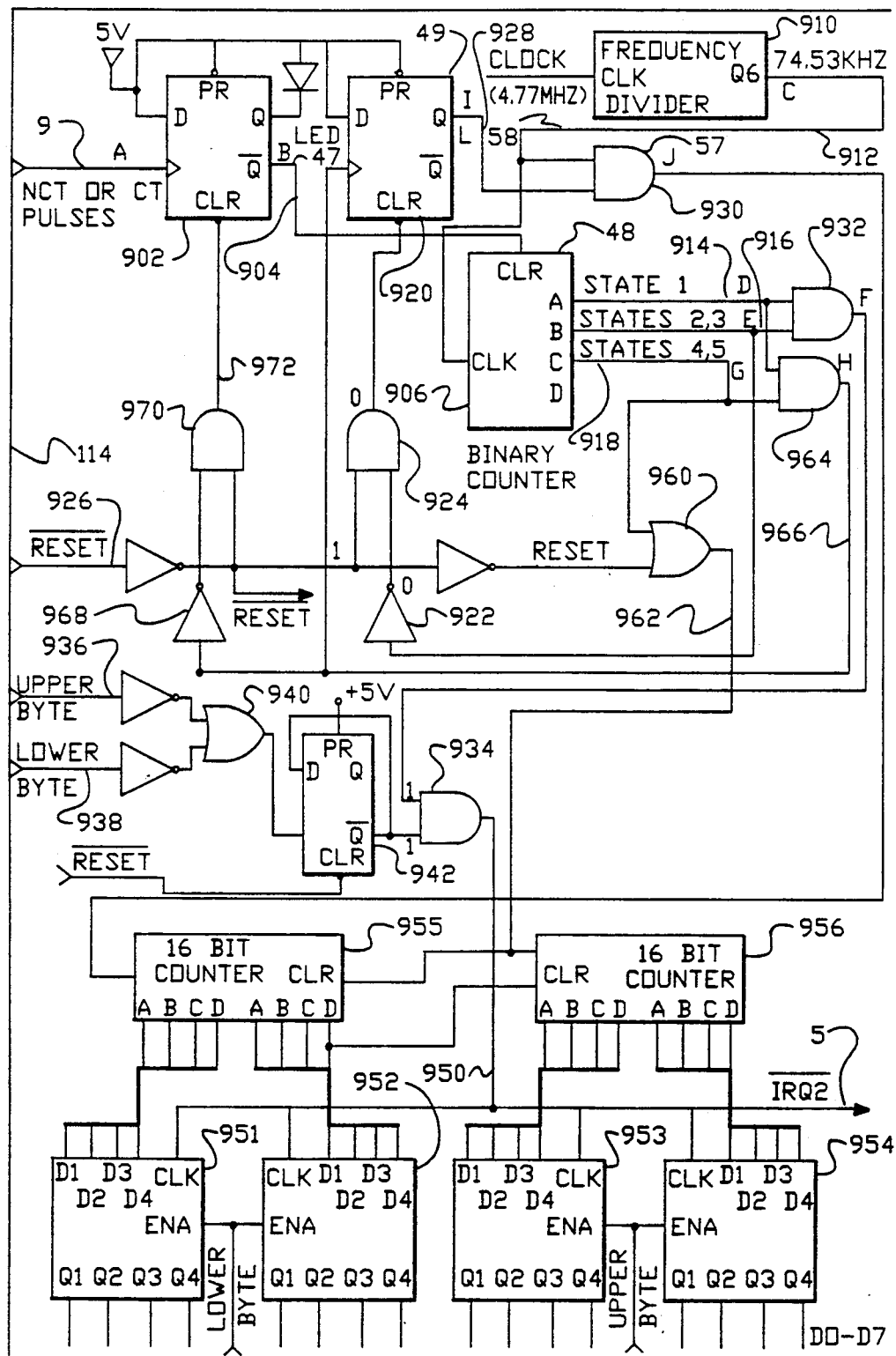
FIG. 9 shows a detailed layout of the pulse counting circuitry.
Figure 10:
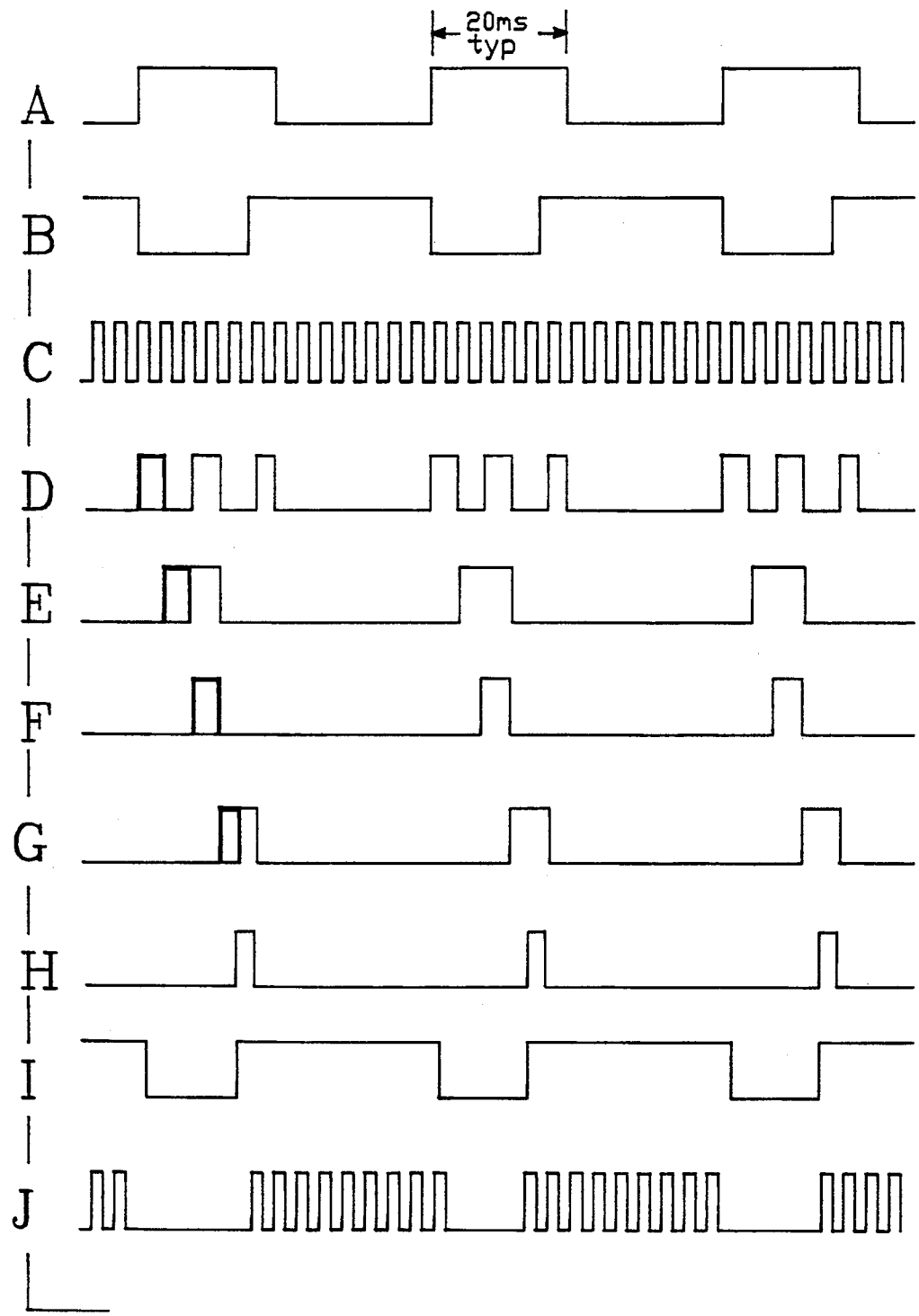
FIG. 10 shows a timing diagram for this pulse counting circuitry, with reference to which the pulse counting circuitry is explained.

Pulses 900 are input from the structure of FIG. 8 into the structure of FIG. 9 which embodies the count pulse structure 114 shown in FIG. 1. Pulses 900 which are input into this structure are from either one of the sources, sensing antenna 100 or inductive pickup 110. However, these pulses 900 are treated as indistinguishable from this point onward, and are counted by the structure of FIG. 9. The counting of pulses 900 will be explained with reference to the circuit of FIG. 9 and the timing diagram of FIG. 10.

Pulses 900 are first input to D-type flip flop 902. D-type flip flop 902 is configured with the D input and the preset connected to a "1" so that clock pulses clock in a "1", and a reset causes the output of the system to return to a zero. Therefore, when one of the pulses 900 goes high as shown in FIG. 10(a), it causes the $\overline{Q}+$ 904 to go low. This removes binary counter 906 from its previously held clear state (high clear) and enables counting to begin. FIG. 10(B) shows $\overline{Q}+$ 904 going low in response to a rising edge of a pulse 900.

Clock source 910 produces a stream of pulses which are shown in FIG. 10(c). In this embodiment, the pulses are at a frequency of 74.53 kilohertz, divided from a clock of 4.77 megahertz. Clock pulses 912 are coupled to the clock input of binary counter 906 so that it will count whenever it is not held in clear.

The output signals from binary counter 906 are used to control the operation of the pulse counting circuit 114 during this crucial time when a firing pulse has been received. Binary counter 906 counts for 5 counts. Each count is initiated by a falling edge of clock signal 912. The states which binary counter 906 assume are labeled as states 1-5 in FIG. 9. State 1 produces a "1" on line 914 and on no other lines. The operation of line 914 is shown diagrammatically in FIG. 10(d), with line 916 being shown in FIG. 10(e) and line 918 being shown in FIG. 10(f). When line 914 is high and no other line is high, the state is defined as count number 1 state. During count number 1 state, however, nothing occurs, except preparation for the remaining control functions.

State 2 is indicated by a binary count of "10", that is a "1" on line 916 and a "0" on line 914. The "1" on line 916 is connected through inverter 922 to AND gate 924, to immediately cause a second D-type flip flop 920 to be cleared. When line 916 is low, both inputs to AND gate 924 are high, leaving a low input to D-type flip flop 920. However, when either input to AND gate 924 becomes a '0', D-type flip flop 920 is immediately cleared. Therefore, state 2 of binary counter 906 clears D-type flip flop 920. Alternately, an external reset signal from reset line 926 clears D-type flip flop 920.

When D-type flip flop 920 is cleared, the Q output 928 thereof assumes a low state. This forces the two main counters 955 and 956 to stop counting as will be discussed herein. Specifically, AND gate 930 is interposed between clock pulses 912 and the 16-bit counter assembly including counters 955 and 956. Counters 955 and 956 are normally arranged to count input clock pulses thereto. However, when Q output 928 of D-type flip flop 920 goes "low", AND gate 930 is disabled, thus preventing any further clock pulses from being propagated therethrough. Therefore, counters 955 and 956 stop receiving clock pulses and stop counting.

Therefore, count 2 prevents further counting of the main counters 955 and 956.

Count 3 is indicated by both lines 914 and 916 being high. When this occurs, AND gate 932 propagates a "1" therethrough to indicate state 3, count number 3. The signal produced by count 3 is shown in FIG. 10(f). This signal is input to one input of AND gate 934. The other input of AND gate 934 normally receives a "1". The output signal of AND gate 934 is labeled herewith. When this signal goes high, it enables four, four-bit data latches 951, 952, 953 and 954 in parallel. These data latches 951-954 receive the outputs of counters 955 and 956 to at their respective D1-D4 inputs, as input data.

Count 3 commands the latches to pass the information at its D1-D4 inputs to the microprocessor data bus. At this time, an interrupt is also produced by line 950, commanding the main processor to read the data which is now available on the data bus.

Therefore, the microprocessor is commanded to read information indicative of a count of the previous time period during state number 3.

State number 4 is indicated by a "1" being present on line 918, with "1"s not being present on any other line. A "1" appearing on line 918 is shown in FIG. 10(g), and is input to OR gate 960. When either input of OR gate 960 goes high, the output thereof goes high. The output 962 of OR gate 960 is connected to the clear inputs of both 16-bit counters 955 and 956. This is because the contents of these counters have been read by the microprocessor during the previous state, state 3. Since the contents of 16-bit counters 955 and 956 have been read, they are cleared to "0" during state number 4.

Therefore, state 4 clears the two 16-bit counters.

State number 5 is defined when a "1" simultaneously appears on lines 918 and 914. This is detected by AND gate 964, which produces a "1" output only when it receives two "1" inputs. Count number 5 therefore produces a "1" on line 966. This is connected through inverter 968 to AND gate 970, where it overrides AND gate 970 to produce one output on line 972. This clears counter 902, causing the $Q^-$ output thereof to go high, thereby holding binary counter 906 in a clear state. This prevents binary counter 906 from performing any further counting until the next tachometer pulse arrives on line 900.

Line 966 produced by count number 5 also triggers D-type flip flop 920, toggling its Q output 928 to a high state. When Q output 928 is high, AND gate 930 is once again enabled, enabling clock pulses from 912 from clock source 910 to be passed through AND gate 930 and to counters 955 and 956. This causes the next counting sequence to begin, and to continue until state 2 after the next tachometer pulse.

Therefore, state 5 disables counter 906 until the next tachometer pulse is received, and also begins counters 955 and 956 counting once again.

Figure 11:
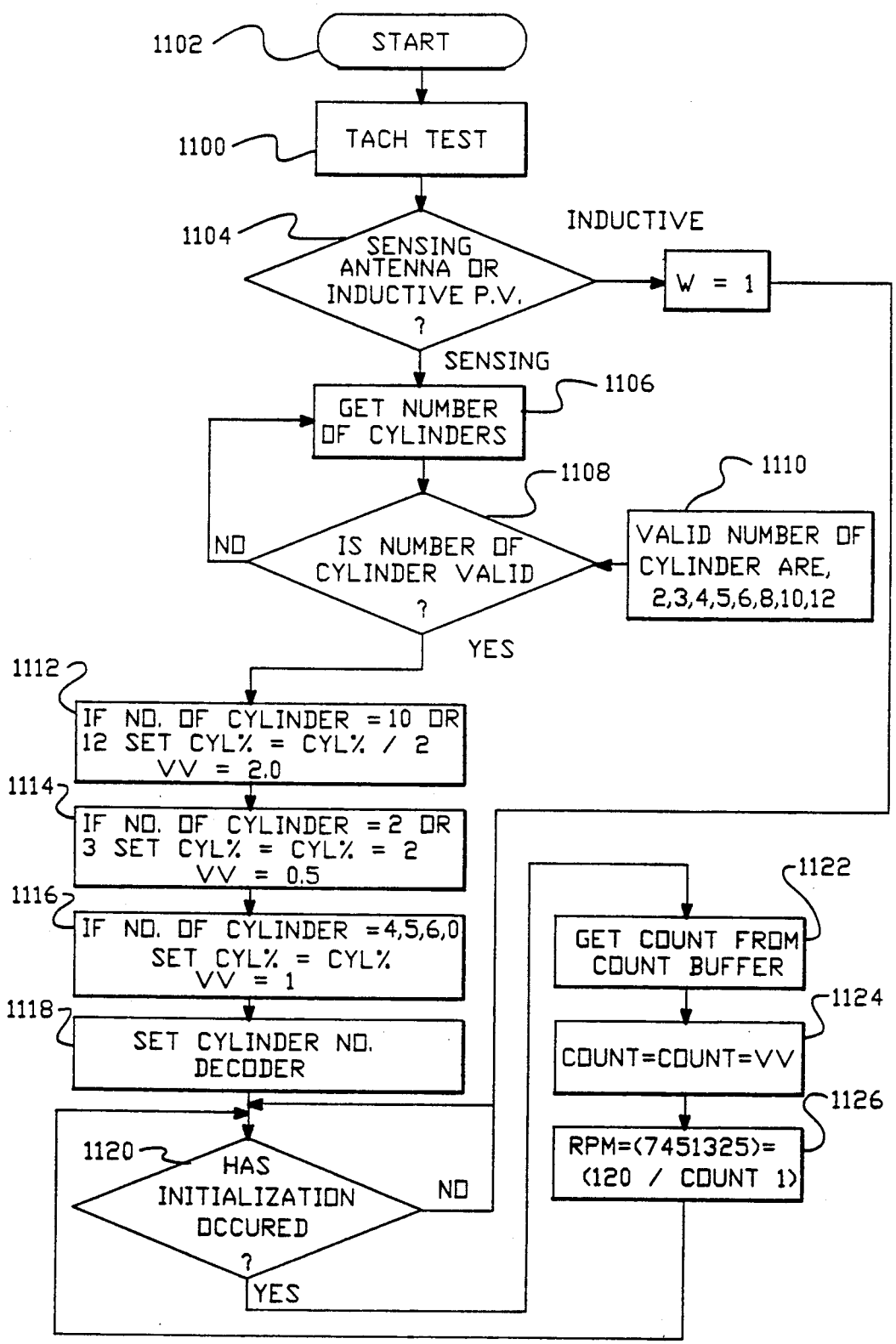
FIG. 11 shows a flow chart used by processor 116.

The entire system is controlled by the processing means. In this preferred embodiment, the processing means is an IBM compatible PC XT computer. The processing means operates according to a predetermined flowchart, which will now be described with reference to FIG. 11.

The flowchart begins at step 1100 and is followed by a short self test at step 112. The first step the program must perform is to determine whether the structure will operate in sensing antenna mode or in inductive pickup mode. This determination is made at step 1104. If the operation will be in sensing antenna mode, one variable VV (described later) is set to 1. If the operation is detected to be inductive pickup mode, the number of cylinders must be determined at step 1106. This can be received from the keyboard or by any other means. Step 1108 determines if the number of cylinders are valid, and if not requests the number of cylinders to be entered once again. A map of the valid cylinder numbers are stored in a memory location, shown in the flowchart as step 1110.

If the number of cylinders is determined to be valid at step 1108, a test is made at step 1111 to determine if the number of cylinders is 10 or 12. This test is made for the purpose of setting the variable VV. VV is a variable which is used to compensate for engines with more than 8 cylinders and less than 4 cylinders by an appropriate weighting. Based on the number of cylinders which the engine has, the processor must determine how to configure the cylinder dividing network 104.

If the number of cylinders is 10 or 12, step 1112 sets the number of cylinder variable CYL% equal to the number of cylinders entered, divided by 2. At this time, the variable VV is set to 2 indicating a weighting factor of 2. This allows the halved number of cylinders to be used, and compensates using the variable VV. If the number of cylinders is 2 or 3, the cylinder number is multiplied by 2 and VV is set to $\frac{1}{2}$ at step 1114. If the number of cylinders is 4, 5, 6 or 8, the number of cylinders remain unchanged and VV is set to 1. It is seen that 10 or 12 are multiples of 5 and 6 and 2 and 3 are multiples of 4 and 6. Therefore, by use of the variable VV, only the dividing ratios 4, 5, 6 and 8 need be used. This simplifies both the hardware and software that is necessary.

Based on this detection, the cylinder number decoder 800 is set at step 1118. A test for initialization is made at step 1120, and if not the system enters an infinite loop until such initialization occurs. If initialization has occurred, control passes to step 1122 which obtains the count from the count buffers 941-945. The actual count is stored in a variable called "count" at step 1124 and is equal to the count received from the count buffer times the variable VV. The RPM is then calculated at step 1126 according to the relation:

RPM=(74531.25) * (120/count).

Control then passes to step 1120 entering an infinite loop which continually calculates the RPM of the system.

As described above, the preferred embodiment of this invention uses an IBM PC XT with two floppy disc drives, a monitor and a keyboard as the processing means, and the tachometer circuit is configured as an expansion card for the PC. An induction pickup and the antenna are attached to this expansion card to receive data from the spark plug wires.

To begin the operation of the system, application software is loaded into the PC by a floppy disc. Once the software is booted up, the operator is prompted to select either sensing antenna or inductive sensing mode. This corresponds to the decision block in step 1104. If induction mode is selected, the operator must install the induction pickup around the spark plug wire. Pulses received by the induction pickup are then sent to the tachometer expansion card where the spacings between the pulses are converted to digital information. The computer analyzes this information and displays an RPM reading on the screen based thereon.

If antenna mode is selected, the operator must enter the number of cylinders into the computer, or receive this number of cylinders via some other means, to initialize the cylinder divider network on the tachometer circuit board. Once this is accomplished, the antenna may be placed on the automobile hood in a location close in proximity to the ignition coil. Signals are once again sent to the tachometer expansion card to be transformed into digital information for analysis by the processor.

Although only a few embodiments have been described above, those of ordinary skill in the art would readily realize that many modifications are possible in the preferred embodiments without materially departing from the teachings thereof. For instance, although the calculation has been set forth as being performed by software, it could also easily be performed by a hardwire dedicated hardware system. Also, any other computer besides the IBM could alternately be used as the processing means.

Accordingly, all such modifications are intended to be encompassed within the following claims.

What is claimed is:

1. A tachometer system for an internal combustion engine, comprising:
   electromagnetic pulse sensing means, coupled in a non-contact manner to an operative area of said internal combustion engine, for sensing an electromagnetic signal produced by a firing of said engine, and producing an output signal indicative thereof;
   means for sensing a parameter indicative of pulse timing in said output signal;
   means for converting said parameter into a value indicative of revolutions of said internal combustion engine per unit time; and
   said sensing means comprising:
   means for receiving said output signal from said electromagnetic pulse sensing means;
   means for detecting a pulse in said output signal;
   means for counting an elapsed time;
   means for selectively enabling and disabling said counting means;
   means for selectively providing an accumulated count of said counting means to an external port; and
   control means, connected to said receiving means, said detecting means, said counting means, said providing means and said selecting means, for initiating a sequence upon detecting a pulse by said detecting means, by, in order: 1) disabling said counting of said counting means, 2) commanding said providing means to provide said accumulated count, 3) resetting said counting means, and finally 4) enabling said counting means.

2. A tachometer system for an internal combustion engine, comprising:
   electromagnetic pulse sensing means, coupled in a non-contact manner to an operative area of said internal combustion engine, for sensing an electromagnetic signal produced by a firing of said engine, and producing an output signal indicative thereof;
   means for sensing a parameter indicative of pulse timing in said output signal;
   means for converting said parameter into a value indicative of revolutions of said internal combustion engine per unit time;
   filtering means, coupled between said electromagnetic pulse sensing means and said parameter sensing means, for filtering characteristics of pulses from said electromagnetic pulse means, said filter means comprising a circuit for extending pulse widths of input pulses while maintaining a voltage proportional to said input pulse, comprising:
   means for receiving said input pulses;
   means for producing a plurality of voltages which differ from one another by a substantially constant amount;
   a plurality of comparators, each connected to receive said input pulses at one compare unit, and each connected to receive one of said voltages from said voltage producing means at another compare input, for producing an output signal indicative of which of said compare inputs has a larger signal;

a plurality of means for producing a pulse having an extended width, one being connected to each said output of each said comparator to produce said extended width pulse based on a state of said comparator to which it is connected; and means for summing outputs of all of said pulse width producing means, so that an amplitude of an output thereof corresponds to a number of said pulse width producing means which are producing said extending width pulse.

3. A tachometer system for an internal combustion engine, comprising:

means for receiving a signal of an antenna which senses an electromagnetic pulse produced by an ignition coil of the engine;

means for receiving a signal from an inductive pickup coupled to a spark plug wire of the engine to sense an electromagnetic pulse produced thereby;

means for selecting one of said signals;

means for sensing a parameter indicative of pulse timing in said selected signal, wherein said sensing means comprises:

means for receiving an output signal from said selecting means;

means for detecting a pulse in said output signal;

means for counting an elapsed time;

means for selectively enabling and disabling said counting means;

means for selectively providing an accumulated count of said counting means to an external port; and control means, connected to said receiving means, said detecting means, said counting means, said providing means and said selecting means, for initiating a sequence upon detecting a determination of a pulse by said detecting means, by, in order: 1) disabling said counting of said counting means, 2) commanding said providing means to provide said accumulated count, 3) resetting said counting means, and finally 4) enabling said counting means; and a personal computer for converting said parameter into a value indicative of revolutions of said internal combustion engine per unit time having a display for visually displaying said value.

4. A tachometer system for an internal combustion engine, comprising:

means for receiving a signal of an antenna which senses an electromagnetic pulse produced by an ignition coil of the engine;

means for receiving a signal from an inductive pickup coupled to a spark plug wire of the engine to sense an electromagnetic pulse produced thereby;

means for selecting one of said signals;

means for sensing a parameter indicative of pulse timing in said selected signal; and means for converting said parameter into a value indicative of revolutions of said internal combustion engine per unit time wherein said converting means is formed by a personal computer having a display for visually displaying said value;

filtering means for filtering characteristics of pulses from said selecting means, wherein said filtering means comprises a circuit for extending pulse widths of input pulses while maintaining a voltage proportional to said input pulse, comprising:

means for receiving said input pulses;

means for producing a plurality of voltages which differ from one another by a substantially constant amount;

a plurality of comparators, each connected to receive said input pulses at one compare input, and each connected to receive one of said voltages from said voltage producing means at another compare unit, for producing an output signal indicative of which of said compare inputs has a larger signal;

a plurality of means for producing a pulse having an extended width, one being connected to each said output of each said comparator to produce said extended width pulse based on a state of said comparator to which it is connected; and means for summing outputs of all of said pulse width producing means, so that an amplitude of an output thereof corresponds to a number of said pulse width producing means which are producing said extended width pulse.

5. A circuit for extending pulse widths of input pulses while maintaining a voltage relation between said pulses, comprising:

means for receiving said input pulses;

means for producing a plurality of voltages which differ from one another by a substantially constant amount;

a plurality of comparators, each connected to receive said input pulses at one compare input, and each connected to receive one of said voltages from said voltage producing means at another compare input, for producing an output signal indicative of which of said compare inputs has a larger signal;

a plurality of means for producing a pulse having an extended width, one being connected to each said output of each said comparator to produce said extended pulse width based on a state of an associated comparator; and means for summing outputs of all of said pulse width producing means, so that an amplitude of an output thereof corresponds to a number of said pulse width producing means which are producing said extended pulse width.

6. A circuit as in claim 5 used in a tachometer system for an internal combustion engine, said tachometer system comprising:

antenna means for sensing an electromagnetic pulse produced by an ignition coil of the engine and producing said input pulses in response thereto;

means for receiving a signal from an inductive pickup coupled to a spark plug wire of the engine;

means for selecting one of said signal and said output of said summing means;

means for sensing a parameter indicative of pulse timing in said selected signal or said output of said summing means; and means for converting said parameter into a value indicative of revolutions of said internal combustion engine per unit time.

7. A system as in claim 6, wherein said sensing means comprises:

means for receiving an output signal from said selecting means;

means for detecting a pulse in said output signal;

means for counting an elapsed time;

means for selectively enabling and disabling said counting means;

means for selectively providing an accumulated count of said counting means to an external port; and control means, connected to said receiving means, said detecting means, said counting means, said providing means and said selecting means, for initiating a sequence upon detecting a determination of a pulse by said detecting means, by, in order: 1) disabling said counting of said counting means, 2) commanding said providing means to provide said accumulated count, 3) resetting said counting means, and finally 4) enabling said counting means.

* * * * *